Feb. 14, 1928.
F. M. LEWIS
1,659,402
CLUTCH MECHANISM
Filed April 12, 1926   2 Sheets-Sheet 1
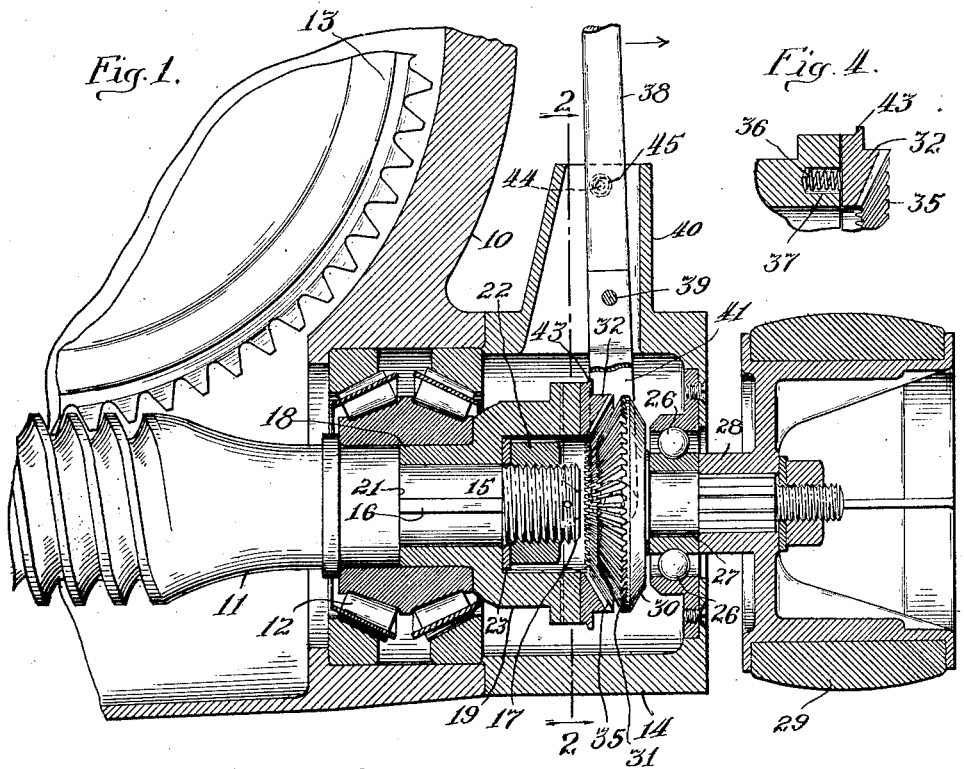
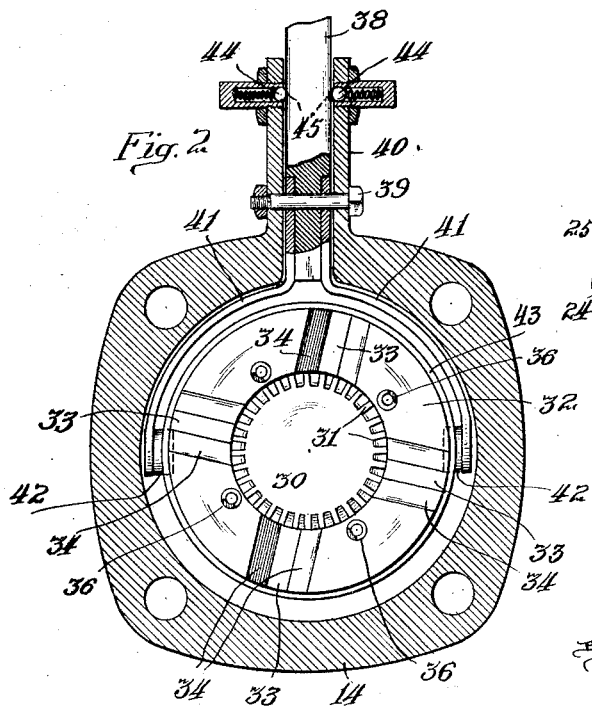
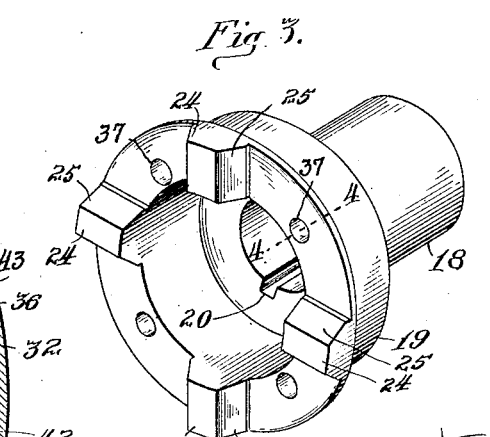
Inventor
Frank M. Lewis,
By Samuel N. Pond,
Attorney.

Feb. 14, 1928.
F. M. LEWIS
1,659,402
CLUTCH MECHANISM
Filed April 12, 1926  2 Sheets-Sheet 2
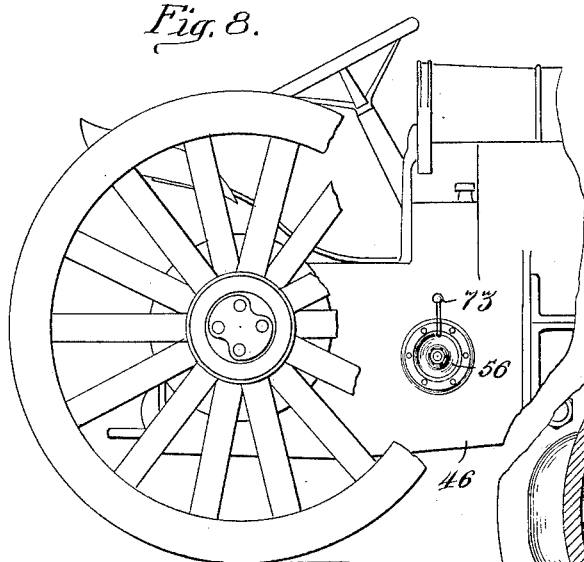
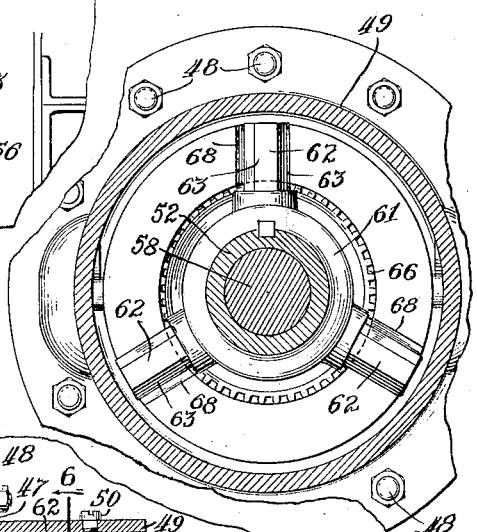
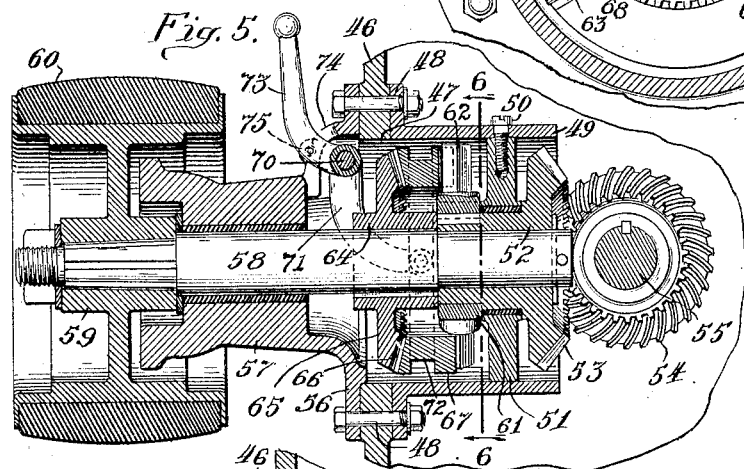
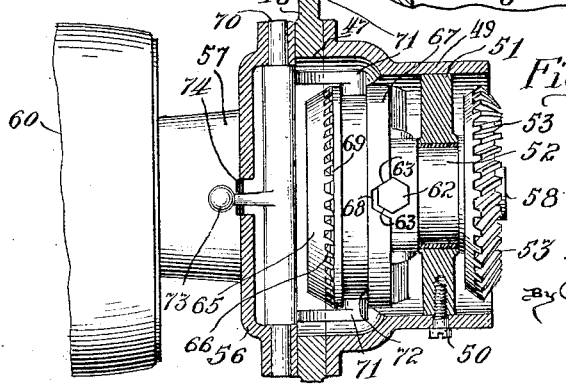
Inventor.
Frank M. Lewis,
By Samuel N. Pond,
Attorney.

Patented Feb. 14, 1928.

1,659,402

UNITED STATES PATENT OFFICE.

FRANK M. LEWIS, OF CHICAGO, ILLINOIS.

CLUTCH MECHANISM.

Application filed April 12, 1926. Serial No. 101,298.

This invention relates to the art of clutches for the transmission of power, and in one intended application has been designed as an improvement in what are known as power take-off devices of tractors, thrashers and other power-operated farm implements.

In the case of tractors, particularly, in order to enlarge their field of usefulness, it has hitherto been the practice in several well-known makes of tractors to extend a continuously driven shaft of the machine through the rear end or side of the housing or frame, and mount a pulley thereon which can conveniently be belted to any other machine or appliance requiring power for its operation. In equipment of this sort, the pulley of the power take-off device is, of course, continuously operating whether it is working or not; and, while involving but a trifling waste of power during idle operation, it is to some extent a source of danger to persons or objects accidentally coming in contact therewith.

One object of my present invention, as applied to the power take-off, is to provide a simple and efficient clutch mechanism between the drive shaft and the power take-off pulley by which the latter may be normally maintained disconnected and idle, but may be readily clutched to the power shaft of the machine when required for power transmission purposes. Another object is to provide a clutch mechanism wherein the co-operating clutch members shall be normally urged into, and held in, engagement through the agency of cams on a rotary driving member, but may be disconnected without arresting the operation of said driving member by manually operable means serving to separate said clutch members.

Still another object is to provide an improved clutch connection between a power take-off pulley or like device and a power drive shaft therefor which may, with slight alterations, be readily applicable to known power take-off equipment.

Other objects and attendant advantages of the invention will be readily apparent to persons familiar with devices of this character from the following detailed description, taken in connection with the accompanying drawings, wherein I have illustrated two practical embodiments of my invention as exemplified in a rear power take-off and a side power take-off, respectively, for tractors, and in which—

Fig. 1 is a vertical section through the lower rear portion of the gear housing of a tractor, showing a rear power take-off connected to the worm shaft of the tractor through the intervention of my improved clutch mechanism;

Fig. 2 is a vertical section on the line line 2—2 of Fig. 1;

Fig. 3 is a perspective elevation of a driving member that is keyed to the worm shaft and carries a circular group of major cams on its face through the operation of which the two clutch members are forced into engagement and positively rotated;

Fig. 4 is a fragmentary cross-section in the plane of the line 4—4 of Fig. 3;

Fig. 5 is a vertical section, generally similar to Fig. 1, showing my improved clutch mechanism applied to a side power take-off;

Fig. 6 is an enlarged cross-section in the plane of the line 6—6 of Fig. 5;

Fig. 7 is a top plan view of Fig. 5, with the housing in horizontal section; and Fig. 8 is a partial side elevation of a tractor showing the relative location of the side power take-off illustrated in Figs. 5, 6 and 7.

Referring first to Figs. 1 to 4 inclusive, 10 designates the lower rear portion of the housing of a tractor rear axle driving gear, 11 designates the worm shaft journaled at its rear end in the usual roller bearing 12 and meshing with and driving the worm wheel 13 that drives the rear axle sections of the tractor.

In carrying out my invention, I provide an extension casing 14 that is attached to the rear end of that portion of the gear casing 10 which supports the worm shaft bearing 12. The rear end portion of the standard worm shaft 11 is turned down to provide a reduced portion 15 and a longitudinal key 16, and, beyond the turned-down portion 15 a threaded terminal portion 17. On the reduced portion 15 of the worm shaft is fitted the hub 18 of a cup-shaped driving member 19, said hub having a longitudinal groove 20 fitted to the key 16 whereby the driving member 19 is coupled to the worm shaft to rotate with the latter. The outer end of the hub 18 abuts against the shoulder 21 on the worm shaft formed at the junction of the reduced portion 15, and the driving member 19 is confined endwise by a nut 22 and a spring or other washer 23, both of which are conveniently housed in the hollow of the driving member 19.

On the face of the driving member 19 is a circular group of radially extending lugs 24, each of which is formed on its opposite sides with oppositely inclined major cams 25, the purpose of which will later appear.

Mounted on the centrally apertured end wall of the auxiliary casing 14 is an antifriction bearing 26 in which is journaled a short driven shaft 27 the outer end of which projects in rear of the casing 14 and is fluted to receive the hub 28 of a power take-off pulley 29. Fast on the inner end of the shaft 27 is a driven clutch member 30 having the general form of a bevel gear, being provided on its inner face with a ring of clutch teeth 31. Between the driver 19 and the driven clutch member 30 is a laterally shiftable clutch member 32 which takes the form of a ring that is coaxial with the driving and driven shafts 11 and 27. The ring 32, as best shown in Fig. 2, is formed on one face with radial recesses 33 each having oppositely inclined cam sides 34. These recesses are occupied by the cam lugs 24 on the driver 19, the cam faces 25 of said lugs co-operating with the cam sides 34 of the recesses to exert an outward thrust on the shiftable member 32 during the turning movement of the driver 19 in either direction, thereby forcing the shiftable member 32 into clutch engagement with the driven member 30. The opposite side of the shiftable member 32 is formed with a ring of gear teeth 35 adapted to interfit with the teeth 31 of the member 30. The shiftable ring 32 is essentially a floating member, being supported, however, against edgewise displacement through the engagement of its cam recesses 33 with the cam lugs 24 of the driver; the construction preferably employing at least four such lugs and recesses spaced ninety degrees apart, so that in all positions of the ring 32 it will be supported by at least two of the lugs 24. The auxiliary housing 14 will, in practice, be packed with heavy oil or grease, and consequently, in order to insure the engagement of the two clutch members 32 and 30 I preferably employ a series of thrust springs 36 (Fig. 4) that are housed in recesses 37 in the face of the driver 19 and bear against the opposed face of the shiftable clutch member 32.

In order to separate the clutch members 30 and 32 and lock them apart when the power take-off is not required, I preferably employ a manually operable lever 38 that is pivoted at 39 within a hollow boss 40 on the upper end of the auxiliary casing 14 and terminates in a fork 41 (Fig. 2) carrying rollers 42 straddling the periphery of the shiftable member 32 and adapted to bear against a peripheral flange 43 thereon. A swing of the lever 38 in the direction indicated by the arrow in Fig. 1 manifestly retracts the shiftable clutch member 32 from the fixed clutch member 30 and interrupts the drive. The lever 38 is locked in such position by any convenient locking means such, for instance, as spring-pressed balls 44 (Fig. 2) mounted in opposite sides of the boss 40 snapping into recesses 45 in the opposite sides of the lever.

It should here be explained that where the above-described mechanism is applied to the propeller shaft, as shown in Fig. 1, means are provided for disconnecting the drive from the differential gear to the traction wheels, such, for instance, as I have disclosed in my co-pending application on a differential mechanism, Serial No. 64,496, filed October 24, 1925, since otherwise it would be necessary to jack up the traction wheels to permit the power take-off to operate while the tractor is standing still.

In Figs. 5 to 8 inclusive I illustrate a clutch mechanism based on the same mechanical principle as that above described applied to what is known as a side power take-off of a tractor. Here 46 designates a side wall of the tractor body frame, in which is formed a circular opening 47. Attached to the inner side of said wall around said opening as by bolts 48 is a circular casing 49 in which is fitted and secured, as by screws 50, a disc 51 centrally widened and apertured to constitute a bearing for the elongated hub or tubular shaft 52 of a spiral gear 53 that is in mesh with a spiral gear 54 fast on a transmission shaft 55 of the tractor, which is running when the transmission is in neutral. Attached to the outer side of the wall 46 as by the bolts 48 is a cover-plate 56, integral with which is an outwardly extending bearing member 57. Journaled in the bearing member 57 and also in the hub or tubular shaft 52 of the gear 53 is a driven shaft 58, the outer projecting end of which is fluted to receive the hub 59 of a power take-off pulley 60. Keyed to the outer end of the tubular shaft 52 is a hub 61 that carries a plurality (herein shown as three) of radially extending studs 62 (Fig. 7), each of which is formed on opposite sides with oppositely inclined cam faces 63 that correspond functionally to the cam faces 25 of the lugs 24 (Fig. 3). The hub 61 of this spider has an end thrust bearing against the fixed bearing member 51 as clearly shown in Fig. 5.

Keyed on the shaft 58 beyond the said spider is the hub 64 of a driven clutch member 65, this latter taking the general form of a bevel gear having a ring of gear teeth 66 on its inner face. Located between and coaxial with the spider 61 and the driven clutch member 65 is a laterally shiftable clutch member 67, that corresponds functionally to the laterally shiftable clutch member 32 shown in Figs. 1 and 2. The member 67 has formed on its inner face a plurality of cam recesses 68 formed with oppositely inclined sides mating with the inclined cam sides of the studs 62 in the manner clearly shown in Fig. 7, and on its other side it is formed with a ring of gear teeth 69 adapted to have clutch engagement with the teeth 66 of the driven clutch member 65.

On a horizontal shaft 70 mounted in the upper portion of the cap 56 is fulcrumed a clutch shifting lever, the forked arms 71 of which engage with a peripheral groove 72 in the shiftable clutch member 67, and the operating handle 73 of which extends upwardly through a slot 74 in the cap 56 and is preferably equipped with any suitable detent indicated at 75 for locking the lever in a position to maintain the shiftable clutch member 67 disengaged from the driven clutch member 65, when the power take-off is not in operation.

In both forms of the invention illustrated, the bevel gear teeth on the fixed and shiftable clutch members are preferably tapered laterally so as to constitute, relatively to the major cams carried by the driving member, minor cams which, under the thrust of the driving member, more securely lock together the teeth of the driving and driven clutch members.

The operation is readily apparent from the foregoing description of the structural features of the invention. When power is applied to the drive shaft, the major cams on the drivers 19 and 61 at once act to force the shiftable clutch member into clutch engagement with the driven clutch member, and the power take-off pulley is rotated. Disengagement of the two clutch members may be instantly effected by shifting the clutch-operating levers 38 and 73, said levers being locked in shifted position and thus causing the shiftable clutch members to turn idly with their respective drivers.

I have herein shown and described practical embodiments of the principle of the invention as applied to a rear power take-off and a side power take-off of a tractor; but it is manifest that the structural details may be varied within the principle of the invention and without sacrificing any of the advantages thereof. Hence I do not limit the invention to the particular embodiments shown for purposes of illustration, but reserve such variations and modifications as fall within the spirit and purview of the appended claims.

I claim—

1. In a clutch mechanism of the character described, the combination of a driving shaft, a driven shaft coaxial with said driving shaft, a driving member fast on said driving shaft formed on one face thereof with a circular group of cams, a driven member fast on said driven shaft formed with a ring of clutch teeth, a laterally shiftable annular member between said driving and driven members formed on one side with cam recesses engaged with the cams of said driving member and on its other side with a ring of teeth adapted to have clutch engagement with the teeth of said driven member, said shiftable member being supported, rotated, and forced into clutch engagement with said driven member through the co-operative action of said cams and cam recesses, and manually operable means for moving said shiftable member out of clutch engagement with said driven member.

2. In a clutch mechanism of the character described, the combination of a driving shaft, a driven shaft coaxial with said driving shaft, a driving member fast on said driving shaft formed on one face thereof with a circular group of radially extending lugs the sides whereof are formed as oppositely inclined major cams, a driven member fast on said driven shaft formed with a circular group of clutch teeth having inclined sides formed as minor cams, a laterally shiftable ring between said driving and driven members formed on one side with radial recesses having their side walls formed as oppositely inclined major cams co-operating with the major cams of said driving member and on its other side with a circular group of teeth formed as minor cams for co-operation with the minor cams of said driven member, said shiftable member being supported, rotated and forced into clutch engagement with said driven member through the co-operative action of said major cams and cam recesses, and manually operable means for moving said shiftable member out of clutch engagement with said driven member.

3. In a clutch mechanism adapted to connect and disconnect a power take-off device to and from a motor-driven element of a tractor or the like, the combination of a casing, a motor-driven shaft journaled in said casing, a power take-off shaft journaled in said casing coaxial with said motor-driven shaft, a driving member keyed to said motor-driven shaft formed on one face thereof with a circular group of major cams, a driven member fast on said power take-off shaft formed with a circular group of minor cams, a laterally shiftable annular member between said driving and driven members formed on one side with major cam recesses engaged with the major cams of said driving member and on its other side with a circular group of minor cams adapted to have clutch engagement with the minor cams of said driven member, a manually operable clutch-shifting lever pivoted in said casing having a forked end straddling said shiftable member for moving the latter out of clutch engagement with said driven member, and means for locking said lever in clutch disengaging position.

FRANK M. LEWIS.